United States Patent Office 3,514,970
Patented June 2, 1970

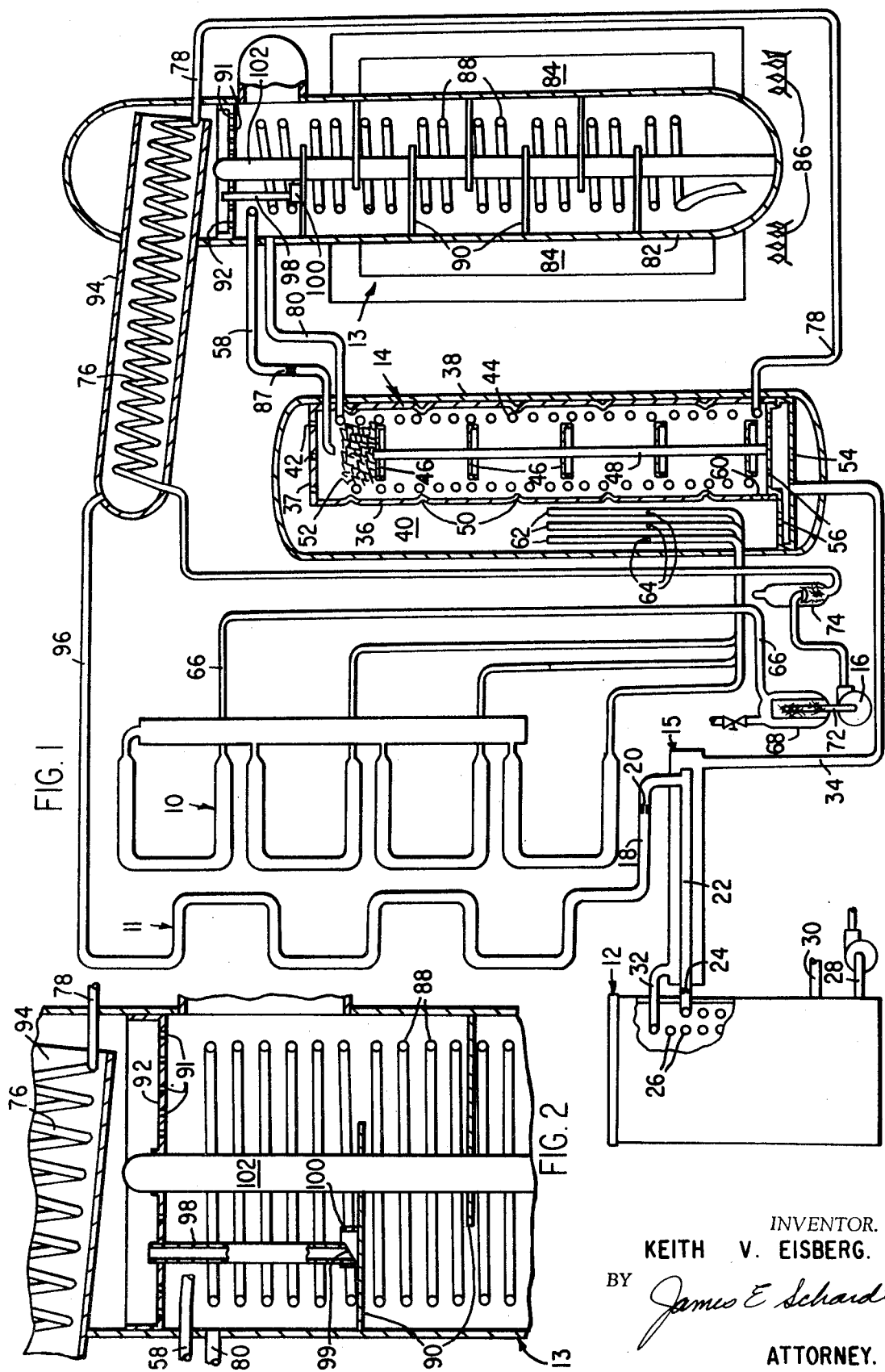

3,514,970
ABSORPTION REFRIGERATION MACHINE
Keith V. Eisberg, Martinsville, Ind., assignor to Carrier Corporation, Syracuse, N.Y., a corporation of Delaware
Filed June 7, 1968, Ser. No. 735,230
Int. Cl. F25b 15/00
U.S. Cl. 62—476    2 Claims

ABSTRACT OF THE DISCLOSURE

An absorption refrigeration machine employing cool weak solution from the absorber as the condensing medium in the rectifier to condense absorbent solution, thereby providing high quality refrigerant to the condenser. A reflux plate is provided between the analyzer and rectifier to increase machine efficiency by mass heat transfer between the rectifier condensate and the vapor passing to the rectifier from the analyzer.

BACKGROUND OF THE INVENTION

For absorption refrigeration machine efficiency, it is desirable to provide substantially pure refrigerant vapor to the condenser. The vapor produced in the generator of an absorption refrigeration machine is ordinarily a mixture of refrigerant and absorbent vapor. A portion of the absorbent vapor is removed from the mixture as it passes through the machine analyzer. To further purify the refrigerant vapor, the mixture may be passed through a rectifier in heat exchange relation with cool solution from the absorber. This will condense the absorbent from the vapor, further purifying the refrigerant vapor. The cooled, condensed, absorbent however, may absorb a quantity of refrigerant vapor. It is therefore desirable to remove as much refrigerant as possible from the condensed absorbent before it is returned through the analyzer into the generator.

SUMMARY OF THE INVENTION

This invention relates to an absorption refrigeration machine employing a reflux plate between the analyzer and rectifier to remove refrigerant from the rectifier condensate. The reflux plate is provided with a plurality of small apertures for passage of vapor from the analyzer to the rectifier. A downcomer is provided for maintaining a desired condensate level in the plate for passage of vapor therethrough. The downcomer also serves to drain excess condensate from the plate.

BRIEF DESCRIPTION OF THE DRAWINGS

FIG. 1 is a schematic flow diagram of an absorption refrigeration machine; and
FIG. 2 is an enlarged sectional view of a portion of the generator of FIG. 1.

DESCRIPTION OF THE PREFERRED EMBODIMENT

Referring to FIG. 1 of the drawing, there is shown a refrigeration system comprising a primary absorber 10, a condenser 11, an evaporator or chiller 12, a generator 13, a solution-cooled absorber 14 and a liquid-suction heat exchanger 15 connected to provide refrigeration. A pump 16 is employed to circulate weak absorbent solution from primary absorber 10 to generator 13. As used herein the term "weak absorbent solution" refers to a solution which is weak in absorbent power and the term "strong absorbent solution" refers to a solution which is strong in absorbent power. A suitable absorbent solution for use in the system described is water and a suitable refrigerant is ammonia.

Liquid refrigerant condensed in condenser 11 passes through refrigerant liquid passage 18, and refrigerant restriction 20 to heat exchange tube 22 of liquid-suction heat exchanger 15. The liquid refrigerant is cooled in tube 22 and emerges from the liquid-suction heat exchanger and passes through refrigerant restriction 24 into heat exchanger 26 in chiller 12.

A fluid medium such as water to be chilled passes over the exterior of heat exchanger 26 where it is chilled by giving up heat to evaporate refrigerant within the heat exchanger. The chilled medium passes out of the chiller 12 through line 28 to suitable remote heat exchangers (not shown) after which it is returned to the chiller through inlet 30 for rechilling.

The cold refrigerant evaporated in heat exchanger 26 passes through refrigerant vapor passage 32 and through liquid-suction heat exchanger 15 in heat exchange relation with liquid refrigerant passing through tube 22. The refrigerant vapor then passes through refrigerant vapor passage 34 into solution-cooled absorber 14.

The solution-cooled absorber 14 is formed within a tubular or cylindrical vessel 38 by a tubular, preferably, cylindrical internal baffle 36 which divides the tubular cylindrical vessel 38 into the solution-cooled absorber 14 and a second solution chamber 40. Vessel 38 is preferably closed at both ends. Baffle 36 may be provided with a top cover plate 37 having a plurality of vapor discharge apertures 42 therein to allow vapor to escape from solution-cooled absorber 14 into chamber 40.

A weak solution heat exchanger 44, preferably comprising a helical coil is disposed within solution-cooled absorber 14. A plurality of horizontal plates 46 are secured to a central support 48 and arranged within baffle 36 to cooperate with annular grooves 50 and heat exchanger 44 to provide a tortuous path for passage of vapor and solution through solution-cooled absorber 14. Suitable packing such as Raschig rings 52 may fill the space between the uppermost plate 46 and the top of the solution-cooled absorber to reduce the tendency for solution froth to escape through discharge apertures 42.

A refrigerant vapor distributor header 54 is secured to close the bottom of baffle 36. Header 54 is provided with refrigerant vapor ports 56 for passage of refrigerant vapor from line 34 into solution-cooled absorber 14 and chamber 40. Strong solution from generator 13 is supplied to the top portion of solution-cooled absorber 14 through line 58. The strong solution passes downwardly through the solution-cooled absorber in counter-flow relation to upwardly passing refrigerant vapor and weak solution passing through coil 44. A strong solution discharge passage 60 is provided adjacent the lower portion of baffle 36 for passage of solution from the solution-cooled absorber into chamber 40.

Solution discharge passages 62 are provided for passing a mixture of refrigerant vapor and solution from chamber 40 to primary absorber 10. Each of the discharge passages comprises a tubular member having an upper open end for admission of vapor and a solution inlet aperture 64 which is disposed below the level of absorbent solution in chamber 40. This insures a mixed flow of liquid and vapor to the primary absorber.

A cooling medium, preferably ambient air, is passed through the primary absorber 10 in heat exchange relation with the absorbent solution to cool the absorbent solution to promote the absorption of the refrigerant vapor in the absorber. The same cooling medium may be supplied to condenser 11 in heat exchange relation with refrigerant therein to condense the refrigerant.

Cold weak absorbent solution passes from primary absorber 10 through line 66 into pump inlet tank 68. Weak solution from inlet tank 68 is supplied to weak solution pump 16 through line 72. Liquid from pump 16 passes through pump discharge tank 74 to a rectifier heat exchange coil 76. From coil 76, the weak solution passes through line 78 to weak solution heat exchanger 44 in solution-cooled absorber 14. The weak solution from coil 44 passes through line 80 into the upper portion of generator 13 along with any vapor formed in coil 44.

Generator 13 comprises a shell 82 having fins 84 suitably affixed thereto as by welding. The generator is heated by a gas burner 86 or other suitable heating means. The weak solution is boiled in generator 13 to concentrate the solution, thereby forming a strong solution and refrigerant vapor.

The hot strong absorbent solution passes upwardly through the analyzer section of generator 13 through analyzer coil 88 in heat exchange with weak solution passing downwardly over the coil. The warm strong solution then passes through line 58 which has solution restrictor 87 therein and is discharged into the upper portion of solution-cooled absorber 14.

Refrigerant vapor formed in generator 13 passes upwardly through the analyzer section thereof where it is concentrated by mass transfer with weak solution passing downwardly over analyzer coil 88. Analyzer plates 90 in generator 13 provide a tortuous path for flow of solution and vapor to assure intimate contact therebetween to improve the mass transfer.

The vapor from the analyzer section which includes refrigerant vapor and absorbent vapor passes through openings 91 of reflux plate 92 into rectifier 94. The vapor passes through rectifier 94 in heat exchange relation with solution flowing through rectifier heat exchange coil 76. Absorbent which is condensed in rectifier 94 may absorb a portion of the refrigerant therein. The resulting absorbent solution flows from rectifier 94 onto reflux plate 92. The substantially pure refrigerant vapor passes from rectifier 94 through line 96 to condenser 11 to complete the refrigeration cycle.

As stated above, the absorbent solution from rectifier 94 collects on plate 92. Excess solution flows over the top of a downcomer 98 which is affixed to plate 92 and projects therethrough a distance equal to the desired depth of collected solution on the plate. The hot vapor from the analyzer must pass through openings 91 and bubble up through the collected solution. In passing through the solution the vapor is cooled, thereby condensing a portion of absorbent vapor from the analyzer. At the same time absorbent solution from the rectifier collected on reflux plate 92 is heated by the vapor passing through openings 91, thereby driving off the refrigerant vapor absorbed therein for passage through the rectifier and line 96 to the condenser.

A portion of the solution passing through downcomer 98 collects in a reservoir formed by a ring 100 and top analyzer plate 90. Ring 100 is suitably affixed as by welding on the lower end of downcomer 98. Reflux plate 92 along with downcomer 98 and ring 100 is supported and located on central post 102 so as to provide contact between ring 100 and top analyzer plate 90. The lower end 99 of downcomer 98 is cut at an angle to provide a passageway for flow of solution from downcomer 98 in the event that the downcomer is assembled with the lower end thereof in contact with plate 90. The solution collecting in ring 100 provides a liquid trap at the bottom of downcomer 98 to prevent the flow of vapor through the downcomer from the analyzer.

Thus, the vapor passing through the reflux plate from the analyzer is purified by condensation of absorbent and the refrigerant dissolved in the solution from rectifier 94 is vaporized to increase the efficiency of the absorption machine.

While I have described a preferred embodiment of my invention it is to be understood that the invention is not limited thereto but may be otherwise embodied within the scope of the following claims.

I claim:
1. An absorption refrigeration system comprising an absorber, an evaporator, a condenser, and a generator connected to provide refrigeration;
an analyzer associated with said generator having analyzer plates therein;
a rectifier for condensing absorbent vapor from a mixture of refrigerant vapor and absorbent vapor supplied thereto from said analyzer;
a reflux plate having a plurality of openings therein, said plate being disposed between said analyzer and said rectifier for passage of vapor from said analyzer through the openings in said reflux plate to said rectifier;
a downcomer associated with said reflux plate for maintaining a predetermined quantity of condensed absorbent solution from said rectifier on said reflux plate, said downcomer projecting through said plate a distance equal to the desired level of collected solution to drain excess solution from said reflux plate, vapor from said analyzer passing through the collected solution to condense absorbent vapor passing from said analyzer to said rectifier and vaporize refrigerant from the solution collected on said reflux plate; and
a ring affixed to the lower portion of said downcomer for engagement with the top analyzer plate to form a liquid trap to prevent passage of vapor from the analyzer through the downcomer, said downcomer projecting downwardly into said ring to provide a passageway between the lower end of the downcomer and said analyzer plate.

2. An absorption refrigeration system according to claim 1 wherein the lower end of said downcomer is cut at an angle to provide a passageway for flow of solution from said downcomer when the lower end of said downcomer is in contact with said analyzer plate.

References Cited

UNITED STATES PATENTS

| 830,466 | 9/1906 | Thoens | 62—495 |
| 2,248,178 | 7/1941 | Kuenzli | 62—484 X |
| 3,368,367 | 2/1968 | Merrick | 62—476 |

LLOYD L. KING, Primary Examiner

U.S. Cl. X.R.

62—495